Figure 1:
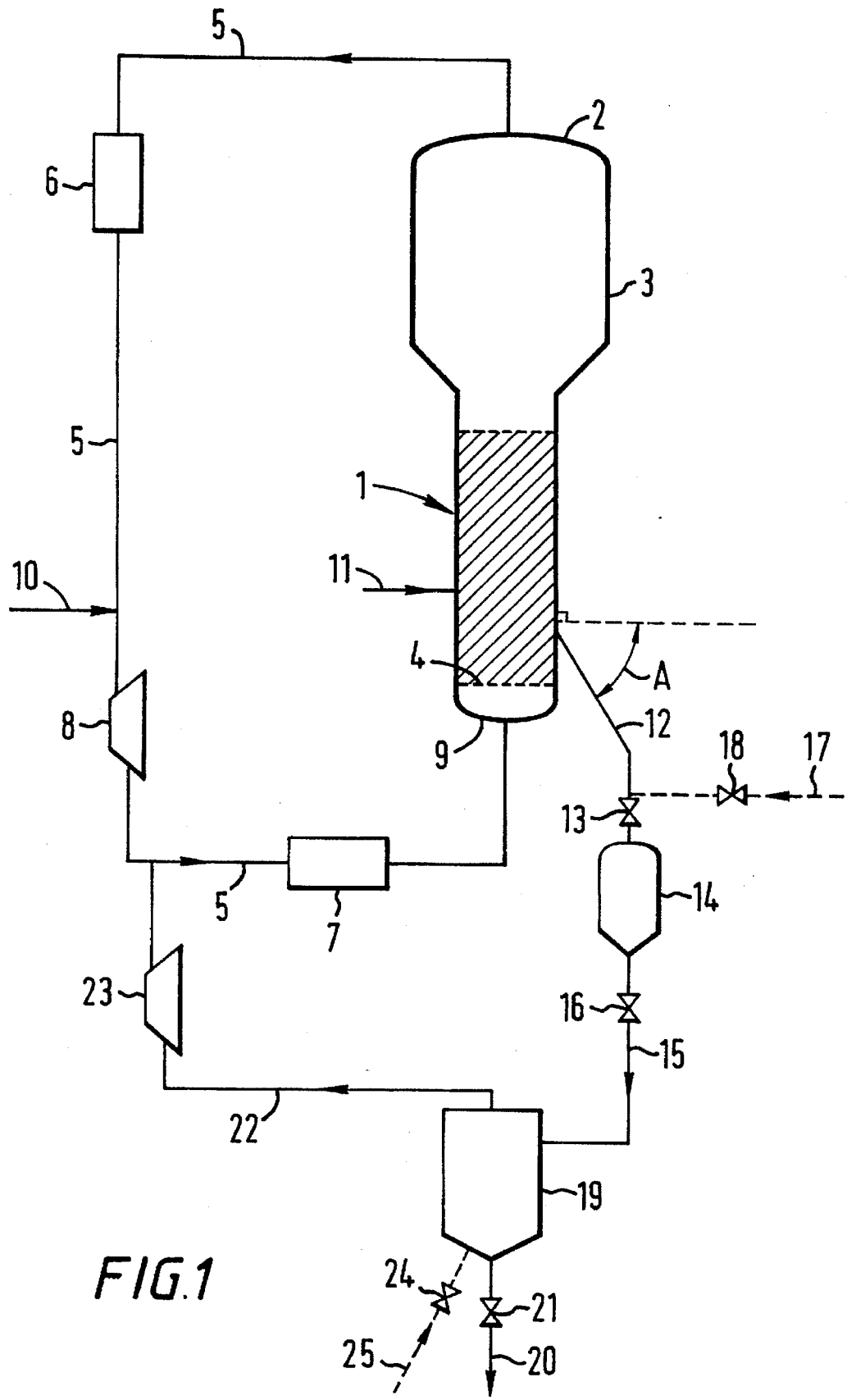

United States Patent [19]
Chinh

[11] Patent Number: 5,633,333
[45] Date of Patent: May 27, 1997

[54] PROCESS FOR POLYMERIZING OLEFIN IN GAS PHASE

[75] Inventor: Jean-Claude Chinh, Martigues, France

[73] Assignee: BP Chemicals Limited, London, England

[21] Appl. No.: 599,709

[22] Filed: Feb. 12, 1996

[30] Foreign Application Priority Data

Feb. 24, 1995 [FR] France ................................. 95 02447

[51] Int. Cl.$^6$ ....................................................... C08F 2/34
[52] U.S. Cl. .......................... 526/65; 526/88; 526/901
[58] Field of Search ................................. 526/65, 88, 901

[56] References Cited

FOREIGN PATENT DOCUMENTS

| 0188125 | 12/1985 | European Pat. Off. .......... C08F 2/34 |
| 0381364 | 1/1990 | European Pat. Off. .......... C08F 2/34 |
| 381364 | 8/1990 | France . |

OTHER PUBLICATIONS

Research Disclosure No. 149, Sep. 1976, pp. 10–12.

*Primary Examiner*—Thomas R. Weber
*Attorney, Agent, or Firm*—Brooks Haidt Haffner & Delahunty

[57] ABSTRACT

The present invention relates to a process for continuous gas-phase polymerization of olefin(s) in a fluidized and/or mechanically stirred bed reactor, comprising a stage of drawing off the polymer out of the reactor, wherein a portion of the bed is transferred into a lock hopper and is then isolated from the reactor in the lock hopper for a period of 5 to 120 seconds so that a substantial amount of the olefin(s) in the said portion polymerizes, before the polymer thus isolated in the said portion is discharged out of the lock hopper. The process advantageously reduces the amount of the gas drawn off with the polymer to be recycled into the reactor and improves the degassing of the polymer by the heat of the polymerization reaction during the isolation period in the lock hopper (FIG. 1).

10 Claims, 1 Drawing Sheet

PROCESS FOR POLYMERIZING OLEFIN IN GAS PHASE

The present invention relates to a process for continuous gas-phase polymerization of olefin(s) in a fluidized and/or mechanically stirred bed reactor, comprising particularly a stage of drawing off the polymer.

It is known, for example according to European Patent Application No. 0 381 364, to polymerize an olefin continuously in a gaseous phase at a pressure higher than atmospheric pressure in a fluidized bed reactor comprising a solid polymer which is being formed, a catalyst and a reaction gas mixture containing the olefin to be polymerized and passing through the reactor in an upward stream. It is also known, for example according to French Patent no. 2 599 991, that the polymer being formed in the bed is drawn off from the reactor with a relatively large quantity of the reaction gas mixture, a large part of which is preferably recovered, recompressed and recycled into the reactor for reasons of economy and of efficiency and of environmental and safety problems. It has also been observed that it is difficult to degas the polymer which is drawn off efficiently and rapidly, and especially to desorb the olefins which are present in the pores of the polymer, this difficulty being added to the preceding one and compounding the problems that arise.

European Patent Application No. 0 381 364 non particularly discloses a stage of drawing off a polymer from a fluidized bed reactor, comprising transferring a portion of the bed into a gas lock and discharging the said portion of the bed from the gas lock into a receiver. It is not suggested to isolate the portion of the bed in the gas lock for a period sufficiently long so that a substantial amount of the olefin(s) isolated in the gas lock polymerizes, before discharging the polymer into the receiver.

Research Disclosure No. 149 dated September 1976 relates to an olefin polymerization process comprising two steps. In a first stept at least one liquid olefin monomer is polymerized in a vessel with stirring in the substantial absence of a polymerization inert diluent in suspension in the liquid monomer, the polymerization being continued until substantially all the liquid monomer has polymerized or vapourized so that a solid dry particulate polymer powder is obtained. In a second step, the polymerization is continued by contacting the powder with a gaseous monomer in the same vessel or in a second vessel with stirring or using a fluidized bed technique wherein the polymerization is terminated or continued for some time e.g. from 2 up to 25 hours. The polymer powder is drawn off from the bottom of the reactor. There is no mention of isolating a portion of the polymer powder in a lock hopper during a period sufficient to polymerize at least a part of the olefin thus isolated with the polymer before discharging the polymer into a degassing zone.

A new process for gas-phase polymerization of olefin(s) has now been found in which the polymer is drawn off from the reactor in such a way that the quantity of the olefin(s) or of the reaction gas mixture which accompanies the polymer drawn off, and which is to be recycled, is substantially decreased and that furthermore, the degassing of the polymer drawn off is made vastly easier.

More precisely, the subject-matter of the present invention relates to a process for continuous gas-phase polymerization of olefin(s) in a reactor containing a fluidized and/or mechanically stirred bed, including a solid polymer, a catalyst and a reaction gas mixture containing the olefin(s) to be polymerized and passing through the reactor at a pressure higher than atmospheric pressure, a process characterized in that it comprises a stage of drawing off the polymer out of the reactor, in which stage a portion of the fluidized and/or mechanically stirred bed is transferred into a lock hopper by bringing the reactor into communication with the lock hopper, and is then isolated from the reactor e.g. by means of a valve in the lock hopper for a period of 5 to 120 seconds, so that a substantial quantity of the olefin(s) present in the said transferred portion polymerizes, before the polymer thus isolated in the said transferred portion is discharged out of the lock hopper.

FIG. 1 shows diagrammatically an apparatus which may be employed for implementing the process of the present invention.

The portion of the bed which is transferred into the lock hopper comprises the polymer, the catalyst and the reaction gas mixture. When the portion of the bed is transferred, preferably it is then isolated from the reactor in the lock hopper under initial conditions, particularly of pressure and of temperature, which are substantially identical with those prevailing in the bed of the reactor. The transfer into the lock hopper is carried out by bringing the reactor into communication with the lock hopper preferably at a pressure that is substantially identical with the absolute pressure $P_1$ prevailing in the bed of the reactor.

The period of isolation of the portion of bed from the reactor in the lock hopper may preferably be from 7 to 90, in particular from 10 to 60 or from 15 to 40 seconds. It may be such that at the end of the isolation the temperature of the portion of the bed or of the polymer thus isolated in the lock hopper is higher than the temperature of the bed, $T_1$, in the reactor and lower than the minimum sintering temperature, Ts, of the polymer, as defined, for example, by P. Compo, G. I. Tardos, D. Mazzone and R. Pfeifer in Part. Charact. I (1984 page 171 to 177). The heating of the portion of the bed and particularly of the polymer is obtained by the heat released by the polymerization reaction which is thus continued during the period of isolation in the lock hopper. More particularly, the temperature of the isolated portion of the bed or of the polymer at the end of the isolation in the lock hopper may range from $T_1+2°$ C. to Ts−5° C., preferably from $T_1+5°$ C. to Ts−10° C., all temperatures being expressed in degrees Celsius. The period of isolation may also be such that, at the end of the isolation, the absolute pressure in the lock hopper has slightly decreased by at least 1%, preferably by 2% to 30%, preferably by 5 to 20% relative to the absolute pressure in the lock hopper at the beginning of the isolation, i.e. preferably to the absolute pressure $P_1$ of the fluidized and/or mechanically stirred bed reactor.

The process may preferably include the following stages:

(1) A portion of the fluidized and/or mechanically stirred bed is transferred from the reactor into the lock hopper by bringing the reactor into communication with the lock hopper, a pressure being established in the lock hopper substantially equal to the absolute pressure $P_1$ of the fluidized and/or mechanically stirred bed reactor is at the end of the transfer, (2) the said portion of the bed is next isolated from the reactor e.g. by means of a valve at the absolute pressure $P_1$ in the lock hopper for a period of 5 to 120, preferably 7 to 90, in particular 10 to 60 or 15 to 40 seconds, which is sufficient to polymerize at least a substantial part of the olefin(s) present in the said portion and e.g. to decrease by at least 1, preferably by 2 to 30%, in particular by 5 to 20%, the absolute pressure in the lock hopper, and (3) at the end of the isolation e.g., when the temperature of the polymer thus isolated in the said portion of the bed reaches a temperature that is higher than $T_1$ and lower than $T_s$, preferably from $T_1+2°$ C. to $T_s-5°$ C., in particular from $T_1+5°$ C. to $T_s-10°$ C., the polymer is discharged out of the lock hopper.

The polymer discharged out of the lock hopper may be transferred into a chamber and/or a column which is (are) specially adapted for degassing the polymer according, for example, to the process described in French Patent No. 2 642 429 or French Patent Application No. 94-06221.

One of the stages of the process according to the invention may therefore consist in transferring and in isolating the portion of the fluidized and/or mechanically stirred bed from the reactor into and in the lock hopper, under conditions, particularly of temperature and of pressure, that are close to those prevailing in the bed of the reactor, in order to continue the polymerization in the lock hopper for a determined period of isolation enabling part of the olefin(s) present in the transferred portion to be consumed. The isolation conditions are preferably controlled and substantially adiabatic in order to raise the temperature of the portion of the bed and of the polymer thus isolated substantially by virtue of the heat released by the polymerization reaction thus continued in the lock hopper during a relatively unusual long period.

In practice, it is estimated that the period in the isolation in the lock hopper may be such that the partial pressure of olefin(s) in the lock hopper decreases by 5 to 40%, preferably by 10 to 30% throughout the isolation period. Under these conditions the temperature of the portion of the bed and of the polymer may rise by 2 to 20° C., preferably by 5 to 15° C. The period of the isolation in the lock hopper depends on the absolute pressure $P_1$, on the partial pressure of olefin(s), on the temperature $T_1$ of the bed of the reactor, on the type of catalyst employed, on the degree of progress of the polymerization reaction in the bed of the reactor, on the catalyst concentration, on the proportion of polymer in relation to the reaction gas mixture in the lock hopper and on the bulk density of the polymer. The isolation period is from 5 to 120 seconds, preferably from 7 to 90, in particular from 10 to 60 seconds. In general the absolute pressure $P_1$ may range from 0.5 to 6 MPa, preferably from 1 to 4 MPa, the partial pressure of olefin(s) may range from 0.2 to 2 MPa, preferably from 0.4 to 1.5 MPa, in particular from 0.5 to 1.2 MPa, and the temperature $T_1$ may range from 30° to 130° C., preferably from 50 to 110° C., in particular from 60° to 100° C.

Thus, it is by virtue of the relatively large consumption of olefin(s) during the isolation in the lock hopper that the quantity of gas, especially of olefin(s) to be recovered from the lock hopper, and to be recompressed and recycled into the reactor, decreases. Furthermore, since the polymer leaving the lock hopper is preferably substantially hotter than that leaving the fluidized and/or mechanically stirred bed reactor, the degassing of the polymer is made considerably easier, particularly during the subsequent stage(s) which may be performed either in the lock hopper itself or, preferably, outside the lock hopper, for example when the polymer is transferred from the lock hopper into a chamber and/or a column specially adapted for degassing, such as that (those) mentioned above.

The process is very particularly suitable for the polymerization of ethylene by itself or as a mixture with at least one $C_3$ to $C_8$ olefin, or of propylene by itself or as a mixture with ethylene, and/or with at least one $C_4$ to $C_8$ olefin and/or with an unconjugated diene.

The process of the present invention is particularly advantageous when the weight quantity of polymer present in the portion of the bed which is isolated from the reactor in the lock hopper is relatively high, per unit volume of the lock hopper, for example from 120 to 450, preferably from 200 to 400, in particular from 250 to 400 kg/m³.

FIG. 1 shows diagrammatically by way of example an apparatus which makes it possible to implement such a process. Thus, a reaction gas mixture at an absolute pressure $P_1$ higher than atmospheric pressure, containing the olefin(s) to be polymerized, passes in an upward stream through a fluidised bed reactor (1) while maintaining in the fluidized state a solid polymer being formed in the presence of a catalyst. The reaction gas mixture passes through a calming chamber (3) which is above the reactor (1), escapes at the top (2) of the reactor and is returned by an external circulation conduit (5) including a compressor (8) and at least one heat exchanger (6, 7), to the base (9) of the reactor under a fluidization grid (4). A catalyst of Ziegler-Natta type, or a catalyst containing a transition metal of metallocene or of chromium oxide type is introduced continuously or intermittently into the reactor (1) via a conduit (11). The olefin(s), such as ethylene, propylene and $C_4$ to $C_8$ olefins and possible other constituents of the reaction gas mixture, such as hydrogen, an unconjugated diene or an inert gas, for example nitrogen or a $C_1$ to $C_6$, preferably $C_2$ to $C_5$ alkane are introduced continuously into the external circulation conduit (5) by at least one conduit (10). The polymer is drawn off from the reactor (1) intermittently by at least one draw-off conduit (12) connecting the reactor (1) to a recovery lock hopper (14). An isolation valve (13) enables the lock hopper (14) to be isolated from the reactor (1) and a discharge valve (16) enables the polymer to be discharged out of the lock hopper (14) into a decompression and degassing chamber (19) at an absolute pressure $P_2$ lower than $P_1$ through the intermediacy of a conduit (15). The ratio $P_1:P_2$ may range from 5:1 to 50:1, preferably from 10:1 to 25:1. The absolute pressure $P_2$ may range from 0.11 to 0.2 MPa, preferably from 0.11 to 0.15 MPa. The chamber (19) generally makes it possible to decompress the polymer drawn off, to separate the latter from the reaction gas mixture accompanying it, to discharge the polymer out of the chamber (19) via a conduit (20) and a valve (21), and to recycle the reaction gas mixture thus separated off via a conduit (22) and a compressor (23) towards the reactor (1), through the intermediacy of the external circulation conduit (5). A conduit (25) provided with a valve (24) may optionally emerge into the chamber (19) in order to introduce a gas or a gas mixture which helps to degas the polymer, for example an inert gas such as nitrogen or a $C_1$ to $C_6$, preferably $C_2$ to $C_5$ alkane, or the reaction gas mixture or one or more constituents of the reaction gas mixture. A conduit (17) provided with a valve (18) optionally feeds the conduit (12) with a purging gas upstream of the valve (13) and preferably near the latter, in order to avoid blocking the conduit (12). The purging gas may be an inert gas such as nitrogen or a $C_1$ to $C_6$, preferably $C_2$ to $C_5$ alkane, or the reaction gas mixture or at least one of its constituents.

The process for continuous gas-phase polymerization of olefin(s) may be carried out in a fluidized and/or mechanically stirred bed reactor, maintained at an absolute pressure $P_1$ ranging from 0.5 to 6, preferably from 1 to 4 MPa. The temperature of the bed of the reactor may be maintained at a value ranging from 30° to 130° C., preferably from 50° to 110° C. A reaction gas mixture may pass through the reactor at an upward velocity which may range from 0.3 to 0.8 m/s, preferably 0.4 to 0.7 m/s. The reaction gas mixture may contain one or more $C_2$ to $C_8$ olefins, for example ethylene or propylene, or a mixture of ethylene with at least one $C_3$ to $C_8$ olefin, for example propylene, 1-butene, 1-hexene, 4-methyl-1-pentene or 1-octene, and/or also with a diene, for example an unconjugated diene. It may also contain hydrogen and/or an inert gas such as nitrogen or, for example, a $C_1$ to $C_6$, preferably $C_2$ to $C_5$ alkane. The polymerization process may in particular be carried out according to the process described in PCT Patent Application WO No. 94/28032. It may be carried out in the presence of a catalyst containing at least one transition metal belonging to groups 4, 5 or 6 of the Periodic Classification of the elements (approved by the Nomenclature Committee of the "American Chemical Society", see "Encyclopedia of Inorganic Chemistry", editor R. Bruce King, published by John Wiley & Sons (1994)). In particular, a catalyst system of the Ziegler-Natta type may be employed, including a solid catalyst containing a compound of a transition metal such as those mentioned above and a cocatalyst containing an organometallic compound of a metal belonging to groups 1, 2 or 3 of the Periodic Classification of the elements, for example an organoaluminium compound. High-activity catalyst systems have already been known for many years and are capable of producing large quantities of polymer in a relatively short time, with the result that it is possible to avoid the stage of removal of the catalyst residues present in the polymer. These high-activity catalyst systems generally include a solid catalyst containing essentially transition metal, magnesium and halogen atoms. It is also possible to employ a high-activity catalyst essentially containing a chromium oxide activated by a heat treatment and used in combination with a granular support based on refractory oxide. The polymerization process is very particularly suitable for being employed with metallocene catalysts such as zirconocene, hafnocene, titanocene or chromocene, or with silica-supported Ziegler catalysts based, for example, on magnesium, titanium and/or vanadium. The abovementioned catalysts or catalyst systems may be employed directly as they are in fluidized and/or mechanically stirred bed reactor, or may be converted beforehand into an olefin prepolymer, in particular during a prepolymerization bringing the catalyst or the catalyst system into contact with one or more olefins such as those mentioned above in a liquid hydrocarbon medium or in the gas phase, according to, for example, a non continuous or continuous process.

The process is very particularly suitable for manufacturing polyolefins in the form of powder, in particular of linear low density polyethylene or high density polyethylene, of density ranging, for example, from 0.87 to 0.97 g/cm$^3$, or of polypropylene or of copolymers of propylene with ethylene and/or $C_4$ to $C_8$ olefins or of elastomeric copolymers of propylene with ethylene and optionally an unconjugated diene of density ranging, for example, from 0.85 to 0.87 g/cm$^3$.

The following examples illustrate the present invention.

EXAMPLE

A gas-phase copolymerization of ethylene with 1-butene is carried out in an apparatus identical with that shown in FIG. 1. The internal diameter of the cylindrical reactor (1) with a vertical side wall is 3 m and its height is 10 m. The reactor has a calming chamber (3) above it. The fluidized bed includes 18 tons of a copolymer of ethylene and 1-butene, of density 0.96 g/cm$^3$, in the form of particles with a mass-average diameter of 750 μm, which has a fluidized density of 300 kg/m$^3$.

The reaction gas mixture passes through the fluidized bed at an absolute pressure $P_1$ of 2 MPa at a velocity according to an upward stream of 0.6 m/s, at a temperature of 90° C., containing, by volume, 30% of ethylene, 1% of 1-butene, 25% of hydrogen and 44% of nitrogen.

A catalyst of Ziegler-Natta type is employed, containing Ti, Mg and Cl, prepared in the form of a prepolymer exactly as in Example 1 of French Patent No. 2 405 961.

A draw-off conduit (12) of 0.05 m internal diameter and 1 m. in length, leaving the side wall of the reactor downwards at an angle A of 60° relative to a horizontal plane, subsequently vertically connects up with a lock hopper (14) with an internal volume of 105 liters, through the intermediacy of a valve (13). The copolymer is drawn off from the reactor (1) according to the following cycle of operations:

the valve (13) is closed, the lock hopper (14) is empty of copolymer at an absolute pressure $P_2$ of 0.12 MPa which is identical with that prevailing in the chamber (19), the valve (16) is open, the valve (16) is closed and the valve (13) is opened, the absolute pressure in the lock hopper rises from 0.12 to 2 MPa and the lock hopper fills with copolymer with a degree of filling with polymer of 305 kg per m$^3$ of the internal volume of the lock hopper, the lock hopper (14) is isolated from the reactor (1) by closing the valve (13) and the lock hopper is thus kept isolated for a period of 40 seconds, at the end of which period the absolute pressure in the lock hopper has fallen to 1.88 MPa and the temperature of the copolymer thus isolated in the lock hopper has reached about 100° C., the valve (16) is opened, the copolymer flows through the conduit (15) into the chamber (19) and the absolute pressure in the lock hopper falls to 0.12 MPa.

The cycle of operations is repeated approximately every 60 seconds. The draw-off device described above is duplicated in the polymerization apparatus. The cycle of the operations is identical for each of the two devices, with a time offset of 30 seconds. Each of the two devices has a discharge conduit (15) which emerges into the chamber (19) of which, in contrast, there is only one, with its system for recycling the gases and discharging the copolymer. The process continues in this way for several days without blocking of the draw-off devices. The stage of degassing of the copolymer in the chamber (19) is very markedly improved, since the copolymer arrives in the chamber (19) at a temperature of approximately −100° C.

I claim:

1. Process for continuous gas-phase polymerization of olefin(s) in a reactor containing a fluidized and/or mechanically stirred bed including a solid polymer, a catalyst and a reaction gas mixture containing the olefin(s) to be polymerized and passing through the reactor at a pressure higher than atmospheric pressure, a process characterized in that it comprises a stage of drawing off the polymer out of the reactor, in which stage a portion of the fluidized and/or mechanically stirred bed is transferred into a lock hopper by bringing the reactor into communication with the lock hopper, and is then isolated in the lock hopper for a period of 5 to 120 seconds, so that a substantial quantity of the olefin(s) present in the said transferred portion polymerizes, before the polymer thus isolated in the said transferred portion is discharged out of the lock hopper.

2. Process according to claim 1, characterized in that the portion of the bed of the reactor is transferred and then isolated from the reactor in the lock hopper under initial pressure and temperature conditions which are substantially identical with those prevailing in the bed of the reactor.

3. Process according to claim 1 or 2, characterized in that the period of isolation in the lock hopper is from 7 to 90, preferably from 10 to 60 seconds.

4. Process according to any one of claims 1 or 2, characterized in that at the end of the isolation the portion of the bed isolated in the lock hopper has a temperature which is higher than the temperature of the bed, $T_1$, in the reactor and lower than the minimum sintering temperature, Ts, of the polymer.

5. Process according to claim 4, characterized in that the temperature of the portion of the bed isolated at the end of the isolation in the lock hopper is from $T_1 +2°$ C. to Ts–5° C., preferably from $T_1+5°$ C. to Ts–10° C.

6. Process according to any one of claims 1 or 2, characterized in that the period of isolation in the lock hopper is such that at the end of the isolation the absolute pressure in the lock hopper has decreased by at least 1% relative to the absolute pressure of the lock hopper at the beginning of the isolation.

7. Process according to claim 6, characterized in that the absolute pressure in the lock hopper has decreased by 2 to 25%, preferably by 5 to 20% relative to the absolute pressure of the lock hopper at the beginning of the isolation.

8. Process according to any one of claims 1 or 2, characterized in that the period of isolation in the lock hopper is such that the partial pressure of olefin(s) in the lock hopper decreases by 5 to 40%, preferably by 10 to 30% throughout the isolation period.

9. Process according to any one of claims 1 or 2, characterized in that the weight quantity of polymer present in the portion of the bed isolated in the lock hopper is from 120 to 450, preferably from 200 to 400 kg/m$^3$ of volume of the lock hopper.

10. Process according to any one of claims 1 or 2, characterized in that a polymerization of ethylene by itself or as a mixture with at least one $C_3$ to $C_8$, olefin, or of propylene by itself or as a mixture with ethylene and/or with at least one $C_4$ to $C_8$ olefin and/or with an unconjugated diene is carded out in the reactor.

* * * * *

UNITED STATES PATENT AND TRADEMARK OFFICE
CERTIFICATE OF CORRECTION

PATENT NO. : 5,633,333
DATED : May 27, 1997
INVENTOR(S) : Jean-Claude Chinh

It is certified that error appears in the above-indentified patent and that said Letters Patent is hereby corrected as shown below:

Col. 2, l. 32, correct the spelling of the name "Pfeffer"

Col. 2, l. 64, insert a percent (%) sign after "1"

Signed and Sealed this

Twenty-third Day of December, 1997

*Attest:*

BRUCE LEHMAN

*Attesting Officer*    *Commissioner of Patents and Trademarks*